(No Model.) 2 Sheets—Sheet 2.
D. HAWKSWORTH.
METHOD OF DESTROYING GRASS, WEEDS, &c., ON RAILWAY TRACKS.
No. 330,700. Patented Nov. 17, 1885.
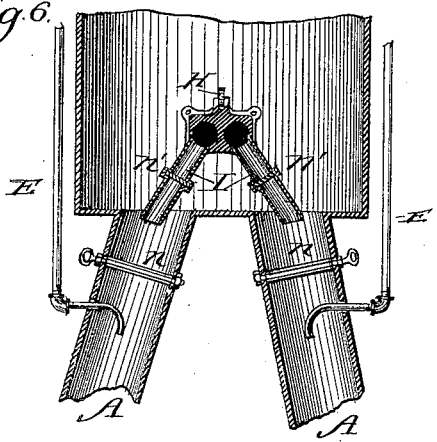
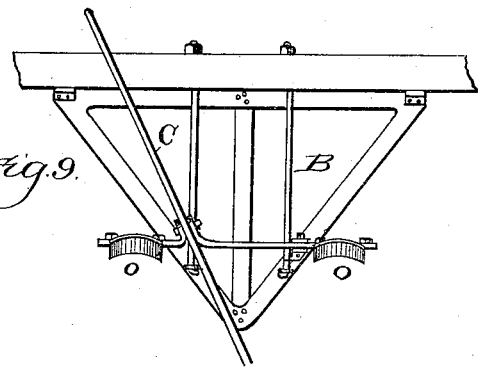
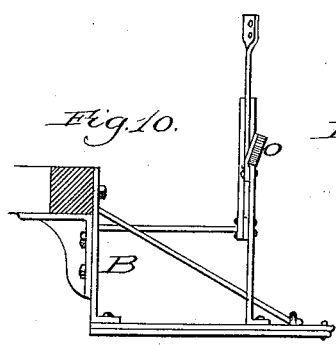
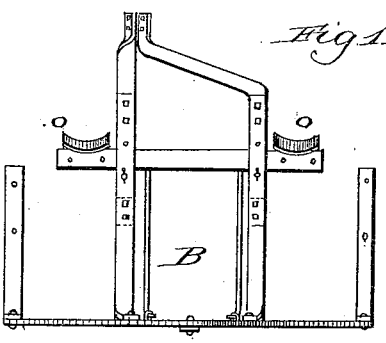
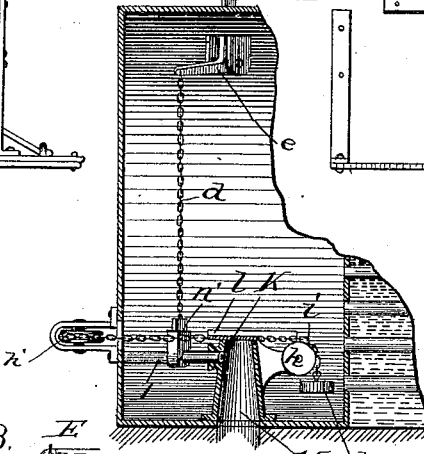
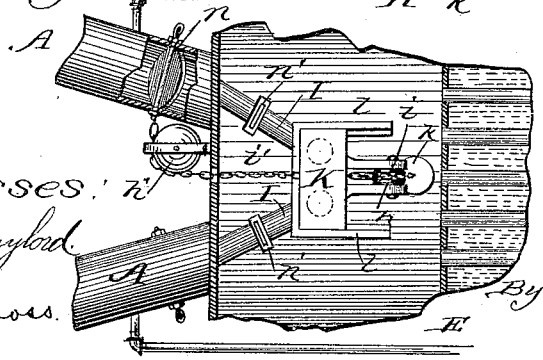
Witnesses:
Chas. E. Gaylord.
Mason Bross.
Inventor:
David Hawksworth,
By Dyrenforth & Dyrenforth,
Attys.
N. PETERS. Photo-Lithographer, Washington, D. C.

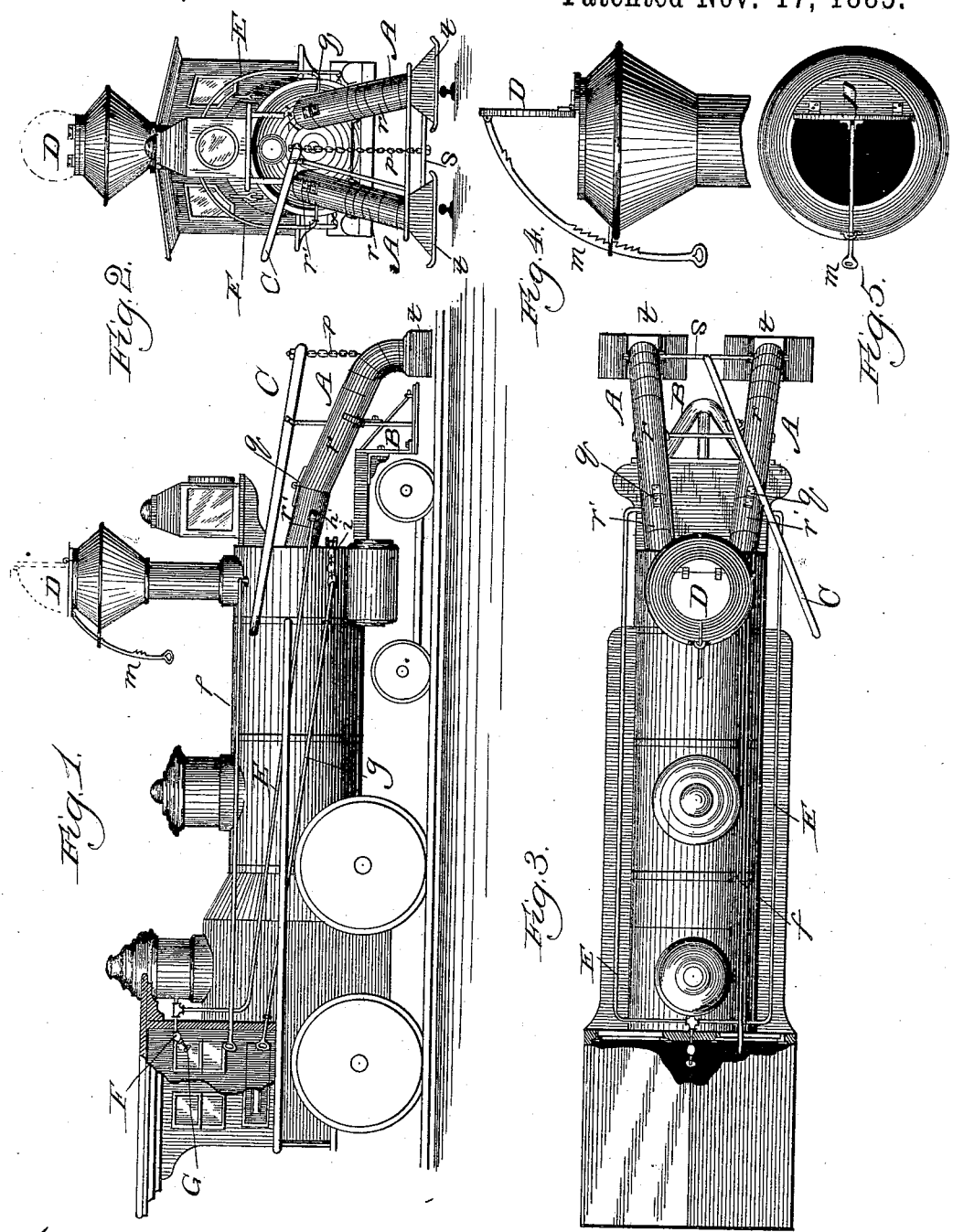

UNITED STATES PATENT OFFICE.

DAVID HAWKSWORTH, OF PLATTSMOUTH, NEBRASKA.

METHOD OF DESTROYING GRASS, WEEDS, &c., ON RAILWAY-TRACKS.

SPECIFICATION forming part of Letters Patent No. 330,700, dated November 17, 1885.

Application filed May 7, 1885. Serial No. 164,729. (No model.)

*To all whom it may concern:*

Be it known that I, DAVID HAWKSWORTH, a citizen of the United States, residing at Plattsmouth, in the county of Cass and State of Nebraska, have invented a new and Improved Method of Destroying Grass, Weeds, and other Ground Vegetation upon and about Roadways and Railway-Tracks; and I hereby declare the following to be a full, clear, and exact description of the same.

My invention has especial importance with relation to railway-tracks, since the grass and weeds which spring up between the tracks and at the sides thereof are liable to be set on fire by sparks and cinders from the locomotives, resulting sometimes in extensive destruction of property. So great is this danger that in same States of the Union railroads are required by legislation to mow or otherwise destroy the grass and weeds to within a certain distance each way from the track. Besides this, the vegetation in some places, especially on the plains, is so rank as to present difficulties, in addition to the one named, well known to all persons familiar with the subject.

The object of my invention is to provide an improved method of destroying or blighting the ground vegetation along a railway-track or roadway, which method may be carried out by various forms of mechanical appliance. For a railway-track the requisite mechanical appliance may either be attached to an ordinary locomotive, or an engine may be specially constructed for the purpose. The latter, of course, would be the plan adopted for roadways.

My method consists, first, in directing and impelling downward upon the vegetation to be destroyed the hot products of combustion from a furnace, commingled with steam; and, secondly, in directing and impelling downward upon the vegetation to be destroyed, in a commingled state, hot products of combustion from a furnace, steam from a boiler, and exhaust-steam from an engine.

I shall proceed to describe my invention as carried out by means of a railway-locomotive provided with certain mechanical attachments to adapt it to the purpose; but I make no claim in this application to the mechanical construction which I show and describe, since this forms the subject of a separate application for a patent.

The construction of the appliance for locomotives will readily suggest suitable devices for applying my method to roadways.

In the accompanying drawings, Figure 1 is a side elevation of a railway-locomotive provided with means for carrying my method into effect; Fig. 2, a front elevation, and Fig. 3 a plan view, of the same. Fig. 4 is an enlarged view in elevation of the upper portion of the smoke-stack, showing the construction of the damper for opening and closing the smoke-stack at will; Fig. 5, a plan view of the same. Fig. 6 is a sectional plan view enlarged of the forward interior portion of the locomotive, showing a special form of nozzle for conveying exhaust-steam either into the smoke-arch or into the tubes which lead to the track, as shall be required; Fig. 7, a central vertical section of the same with the valve and means for regulating it; Fig. 8, a plan view of the same; Fig. 9, a plan view of the frame for supporting the tubes which direct the products of combustion to the ground; and Fig. 10 a side view, and Fig. 11 a front view of the same.

A A are two tubes projecting obliquely downward from the front of the smoke-arch of the locomotive and terminating in flaring outlets, $t$, spreading over the inside and outside of the track. These may be extended laterally, if desired, or branch tubes or additional tubes may be employed to include a broader swath than that indicated. The lower ends of the tubes are connected together by a bar, $s$, above the flaring outlets, and are each formed in two sections, $r$ and $r'$, hinged together, as shown at $q$, in order that when it is desired to use the locomotive for purposes other than that of destroying weeds and the like, the tubes A may be turned up out of the way. To permit this to be easily effected, the front of the engine is provided with a frame, B, in which a lever, C, is pivoted above the tubes A, and the lever is connected at its forward end by a chain, $p$, to the bar $s$. The tubes A rest when down in curved bearings $o$ at the sides of the frame, and any suitable means may be provided in the way of a catch or analogous mechanism for retaining the lever when the tubes are lifted. The tubes A are further provided with dampers, n, in the sections r', to permit them to be wholly or partly closed when required. The smoke-stack is provided with a damper, D, operated and held in position when open or closed by a handle, m, with a saw-tooth rack, as shown.

E E are steam-pipes leading from the dome to the interior of the tubes A, forward of the dampers n, and connected with a globe-valve, F, at the cab, operated from the cab by the knuckle-jointed handle G. It will thus be seen that these steam-pipes serve as blowers to impel the products of combustion from the smoke-arch through the tubes A to the surface of the ground.

Figs. 6, 7, and 8 show the construction of a double nozzle, H, leading from the steam-chests into the smoke-arch, and having branches, I I, provided with dampers, n', and leading into the tubes A. The top of the double-nozzle H is provided with a damper or valve, K, sliding in guides l, and normally open by reason of the weight k, connected to the sliding damper by a chain, i, passing over sheave-pulley, h. A chain, i', connected to the opposite side of the sliding valve and passing over an exterior sheave-pulley, h', permits this damper to be operated from the cab by means of a rod, g. A rod, f, extending from the cab, and connecting with a bell-crank lever, e, connected in turn by a rod or chain, d, to the valves n' in the branch nozzles I, permits these valves to be opened and closed at will from the cab; and the remaining dampers may likewise be operated from the cab, if desired, by means of suitable connections.

The operation of the various parts described is as follows: Steam being up, it will be seen that by having the damper in the smoke-stack and the sliding damper of the nozzle H closed, and the dampers in the tubes A and also those in the branches I I of the nozzle H open, and opening the globe-valve F, thus permitting steam from the dome to rush forcibly into the tubes A, the hot products of combustion from the furnace of the locomotive, commingled with live steam, and when the locomotive is in motion exhaust-steam also, will be impelled forcibly upon the ground, the obvious effect b ing to blight any vegetation within the pa h of these agents. The most formidable agent of the three named is the hot products of combustion from the furnace. An impelling agent is required, however, and the one which I employ is steam under pressure directed into the tubes as represented, first, because steam is the most convenient and effective impelling agent that can be had; and, second, because the steam lends its own blighting influence to that of the hot products of combustion, thus performing a twofold function. The steam may be derived from any available source—as from the dome or the exhaust; but steam taken from the dome is preferable, being the more active, and, where the circumstances permit, as in the present instance, the diverting of the exhaust-steam also into the tubes through which the other agents are conveyed to the ground adds to the whole effect.

By opening the damper in the smoke-stack and the sliding damper of the nozzle H, closing the dampers in the tubes A and branch tubes I, and cutting off the flow of steam to the tubes A from the dome the locomotive may very quickly be put into condition for ordinary running, either to get out of the way of trains or to do light running on branch lines or elsewhere. When thus used, it will often be found convenient to lift the tubes A out of the way by means of the lever provided for that purpose.

What I claim as new, and desire to secure by Letters Patent, is—

1. The method of destroying grass, weeds, and similar vegetation along railways, which consists in directing and impelling downward upon the vegetation to be destroyed hot products of combustion from a furnace commingled with steam, substantially as described.

2. The method of destroying grass, weeds, and similar vegetation along railways, which consists in directing and impelling downward upon the vegetation to be destroyed hot products of combustion from a furnace commingled with live steam from a boiler, and with exhaust-steam from an engine, substantially as described.

DAVID HAWKSWORTH.

In presence of—
GEORGE BALLANCE,
WASH SMITH.